United States Patent Office  3,060,681
Patented Oct. 30, 1962

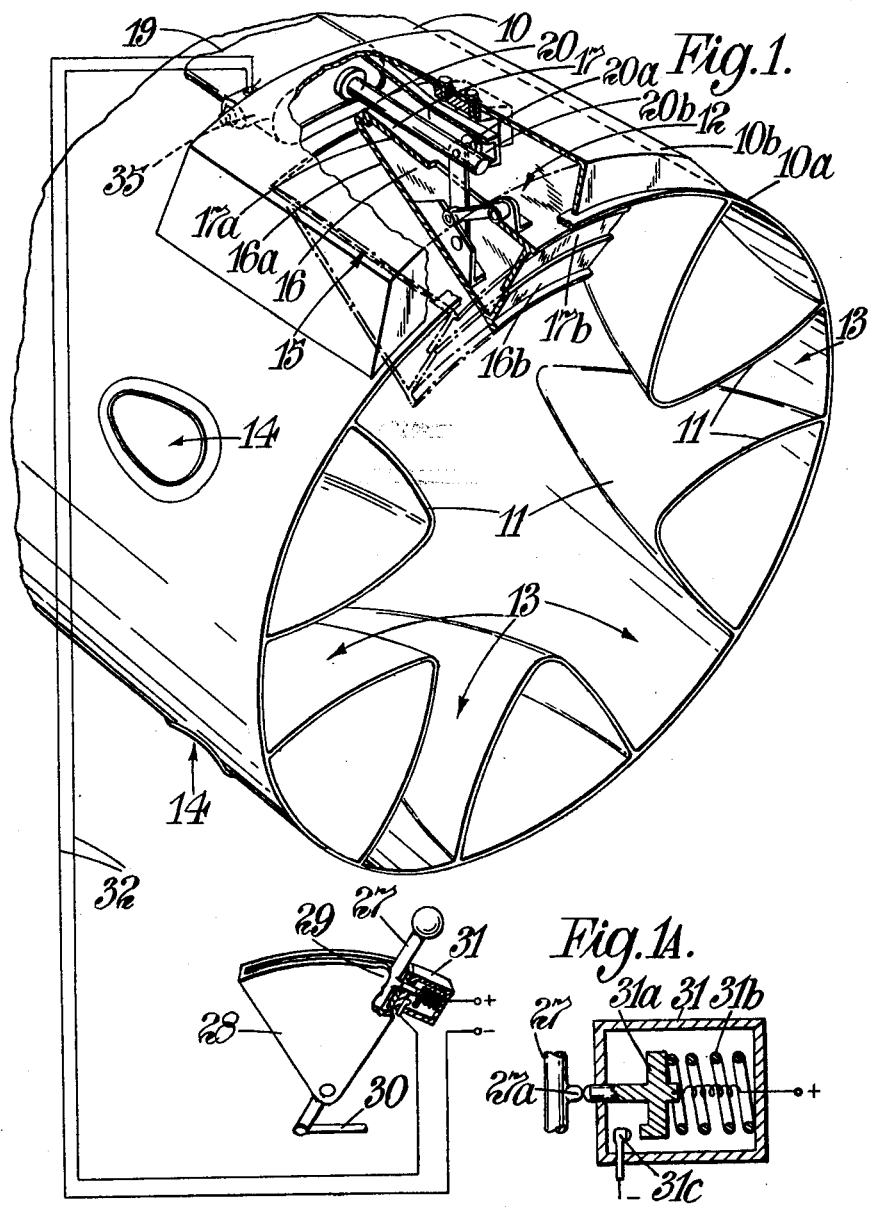

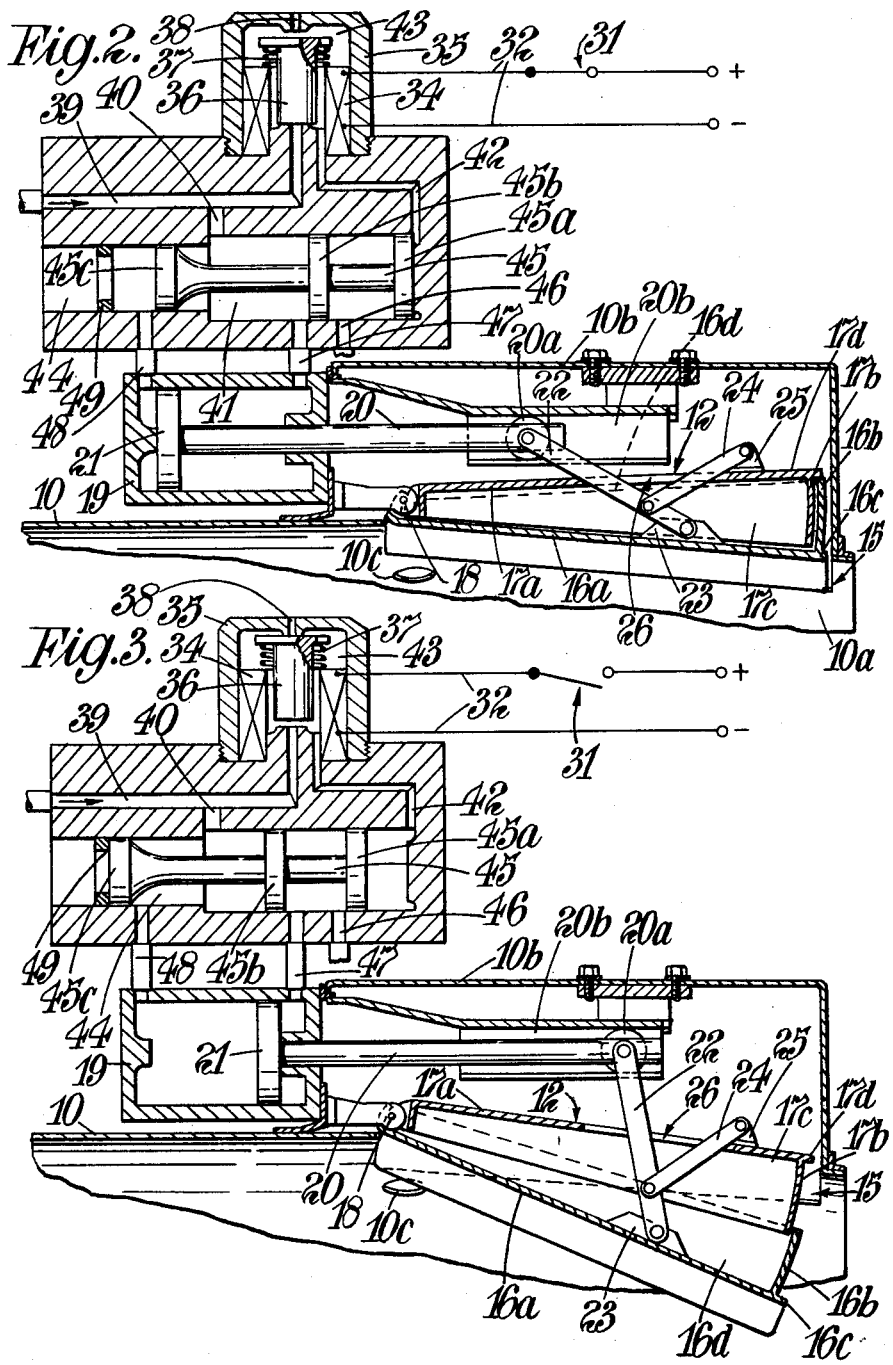

3,060,681
JET PROPULSION ENGINE WITH ADJUSTABLE NOZZLE
Frederick William Walton Morley, Castle Donington, and John Michael Storer Keen, Derby, England, assignors to Rolls-Royce Limited, Derby, England, a British company
Filed Mar. 9, 1959, Ser. No. 798,239
Claims priority, application Great Britain Mar. 13, 1958
4 Claims. (Cl. 60—35.6)

This invention comprises improvements in or relating to aircraft gas-turbine jet-propulsion engines.

In such aircraft, the propulsion nozzle may be of fixed effective outlet area and in such case the nozzle area will be matched to the engine to give maximum thrust at maximum engine rotational speed so that maximum power is available for take-off. Such fixed area nozzles do not however permit maximum economy in flight.

This invention therefore has for an object to provide a nozzle arrangement and control therefor by which maximum thrust is obtainable at take-off of an aircraft and by which economic operation of the engine is possible in cruising flight.

According to the present invention, an aircraft gas-turbine jet-propulsion engine has a propulsion nozzle provided with an adjustable member for varying the nozzle area which member is movable between a reduced-area position and a maximum area position, and control means for the adjustable member whereby the adjustable member is moved to the reduced-area position only when the pilot's engine throttle lever is moved to its setting corresponding to take-off of the aircraft and whereby for other settings of the throttle lever the adjustable member is in its maximum area position.

In one arrangement according to the invention, the control means comprises a switch which is actuated when the throttle lever reaches and leaves the take-off setting to effect the desired control on a pressure fluid supply to a ram for actuating the adjustable member. The adjustable member is preferably in the form of a wedge-shaped flap occupying a cut-out in the propulsion nozzle wall and pivoted at its upstream end to swing inwardly to the reduced area position and outwardly to the maximum area position. The cut out is preferably closed by a blister housing.

The invention has an important use in connection with engines having "silenced" nozzles of the class comprising a series of equi-angularly spaced fixed lobes projecting into the exhaust gas stream flowing in the nozzle so that downstream of the nozzle the exhaust gas jet comprises peripherally a series of angularly-spaced streams separated by atmospheric air. In such nozzles, the adjustable member conveniently replaces one of the lobes.

The adjustable member and blister housing are preferably of the form described in United States patent application Serial No. 646,498, filed March 15, 1957, in the name of J. M. S. Keen, which issued as Patent No. 2,990,029, June 27, 1961.

One construction according to the invention employing such a modified silenced nozzle will now be described with reference to the accompanying drawings, in which:

FIGURE 1 is a perspective view of the nozzle and its control, part of the adjustable member and blister housing being broken away to show the construction.

FIGURE 1A shows to a larger scale part of the control illustrated in FIGURE 1,

FIGURES 2 and 3 show in detail the operating mechanism for the adjustable member, FIGURE 2 showing the maximum area position and FIGURE 3 the reduced area position.

The nozzle shown in FIGURE 1 is suitable for use with a simple aircraft gas-turbine engine from which the exhaust gases flow into a jet pipe 10, the downstream end 10a of which has secured to its internal wall a series of five fixed lobes 11. The lobes 11 have an angular spacing as if there were six equi-angularly spaced lobes and at the position which would otherwise be occupied by the sixth lobe, there is provided an adjustable member 12. The lobes 11 are hollow, are open at the downstream ends and increase in cross-sectional area at right angles to the nozzle axis from their upstream to their downstream ends, so that there is thus formed a series of channel-like spaces 13 in which the exhaust gas flows and so that the total cross-sectional area of the nozzle available for flow of exhaust gas decreases from the upstream ends of the lobes 11 towards their downstream ends. The interiors of the lobes 11 are open to atmosphere externally of the jet pipe portion 10a through ports 14 and in operation of the nozzle air flows through ports 14 into the lobes and leaves the lobes at their downstream ends, so cooling the lobes, reducing the aerodynamic drag of the nozzle and providing streams of air separating the exhaust gas streams issuing from channels 13 thereby giving a silencing effect. The jet pipe portion 10a may be cylindrical or as indicated in FIGURES 2 and 3 may be frusto-conical.

The adjustable member 12 (FIGURES 1, 2 and 3) occupies a cut out 15 in the wall of the jet pipe portion 10a and comprises inner and outer flaps 16, 17 respectively which are carried hingewise by a pivot pin 18 at their upstream ends. The cut out 15 is covered by an external blister housing 10b.

The inner flap 16 has a main wall portion 16a, an end wall 16b projecting outwardly from the wall portion 16a adjacent its downstream end to leave a lip 16c and a pair of triangular side walls 16d along the axial edges of the wall portion 16a. The outer flap 17 has an outer wall 17a, an inwardly projecting end wall 17b, and triangular side walls 17c, and the walls 17b, 17c telescope in the well formed by the walls 16b, 16d of the inner flap 16; the outer flap 17 also has a lip 17d at its downstream end.

The flaps 16, 17 swing about pivot pin 18 under the action of a ram 19 having a rod 20 connected to the ram piston 21. The end of rod 20 is provided with a roller 20a which runs in a track 20b supported from the blister housing 10b and the rod 20 is connected by a link 22 to a bracket 23 on the wall 16a. A link 24 is pivoted to the link 22 between its ends and extends to a bracket 25 on the wall 17a. The links 22, 24 project through a slot 26 in the wall 17a.

The wall of the jet pipe is provided, in the region of the blister housing 10b with apertures 10c which connect the interior of the blister housing 10b with the nozzle so that the pressure within the blister is equalised with that within the nozzle.

Such pressure-balanced flap member is described more fully in said Keen Patent 2,990,029.

When the ram piston 21 is at the left-hand end of its travel (FIGURE 2), the wall 16a is substantially flush with the wall of jet pipe portion 10a the lip 16c forming, with the edge of the cut-out 15, a restricted outlet from the interior of the blister housing 10b, and the flap 17 is telescoped into the flap 16 with lip 17d resting on the upper edge of wall 16b. In this position of the flaps 16, 17, the outlet area of the nozzle is a maximum and is employed for economical cruising.

With the ram piston 21 at the right-hand end of its travel (FIGURE 3), the flaps 16, 17 are swung inwardly, the flaps 16 moving to a greater angular extent than flap 17 so that the walls 16b, 17b are substantial continuations one of the other and likewise walls 16d are substantial inward continuations of walls 17c, and also so that lip 17d lies close to the downstream end of the jet pipe. With the flaps 16, 17 in this position, the outlet area of the nozzle is a minimum and this position of the flaps is employed during take-off only, there being a control mechanism provided to ensure that ram piston 21 moves to the right only when the pilot's engine throttle lever 27 (FIGURE 1) is set for take-off.

The lever 27 works in a quadrant gate 28 having a baulking step 29 at a position just beyond the maximum R.P.M. position and for take-off the lever is moved beyond the baulking step 29 into the position shown in FIGURE 1. The lever 27 has a link 30 by which it is connected to the engine fuel control mechanism.

A microswitch 31 is mounted on the gate 28 and it is arranged that when the lever reaches the position of FIGURE 1, a nib 27a on it (FIGURE 1A) engages a movable contact-carrying member 31a of the switch and displaces it against spring 31b out from contact with a fixed contact 31c so breaking a circuit 32 containing an energising coil 34 of a solenoid operated valve 35 (FIGURES 2 and 3) mounted on the ram 19. When the lever 27 is moved to the left from the position of FIGURE 1, the spring 31b urges the contacts 31a, 31c into engagement so energising the coil 34. (See FIGURE 2).

The solenoid operated valve 35 has a valve member 36 which acts as the solenoid armature and is loaded by a spring 37 towards a position (FIGURE 3) in which it closes a vent hole 38 in the body of the valve 35 and away from a position (FIGURE 2) in which it closes a duct 39 in the body of a valve controlling the supply of operating fluid to the ram 19. The duct 39 carries a supply of pressure air and has a port 40 leading from it into the left-hand end of a large diameter bore 41. A further bore 42 leads from the right-hand-end of this bore to a space 43 within the valve 35.

A small diameter bore 44 leads from the left-hand end of the bore 41 and the bores 41, 44 contain a piston valve 45 having two lands 45a, 45b in the large bore and a land 45c in the small bore. The left-hand end of bore 44 is open to atmosphere and there is provided an atmospheric vent 46 opening into bore 41 so as always to vent the space between lands 45a and 45b. A connection 47 leads from the bore 41 to the right-hand end of the ram 19 and a connection 48 leads from the bore 44 to the left-hand end of ram 19.

The operation is as follows:

With the lever 27 in any position in the quadrant gate 28 except that for take-off, switch 31 is closed and coil 34 is energised so that valve member 36 is moved against spring 37 to open vent hole 38 and close the end of drilling 39. The right-hand end of piston valve 45 is thus at atmospheric pressure and the space between lands 45b, 45c is at high pressure, so that, due to the difference in the areas of these two lands, a load is exerted on the piston valve 45 to hold it at the right hand end of its travel. With the piston valve 45 in this position, connection 47 is open via the space between the lands 45b, 45c to the pressure fluid duct 39 whilst connection 48 is to the left of land 45c and is thus open to atmosphere. Thus the ram piston 21 is held in its left-hand position and the adjustable member 12, formed by flaps 16, 17, is held in the maximum area position.

On movement of lever 27 into the position of FIGURES 1 and 3, switch 31 is opened and coil 34 is deenergised so that spring 37 urges member 36 to close vent hole 38 and to uncover the end of duct 39. Pressure air thus passes through space 43 and duct 42 to the right-hand end of piston valve 45 which now moves to the left against a stop 49. In this position, connection 48 is open via the space between lands 45b, 45c to the pressure fluid duct 39, whilst connection 47 is open to the space between lands 45a, 45b and thus is vented to atmosphere. The ram piston 21 is thus moved to the right and the adjustable member 12, formed by flaps 16, 17, is moved to the minimum area position.

It is arranged that with the member 12 in the position of FIGURE 3, the outlet area of the nozzle is matched to be correct to give the maximum rated thrust of the engine, and thus when the member 12 is in the maximum area position of FIGURE 2 more economical cruising can be achieved than with a fixed nozzle of an area equivalent to the minimum area.

We claim:

1. An aircraft gas-turbine jet-propulsion engine having a fuel system supplying fuel to the engine including a pilot's throttle lever having a substantial range of adjusting movement between an engine idling setting and a maximum thrust setting, and a variable nozzle having a nozzle area for maximum power and a configuration which at takeoff and cruising produces silencing of the jet gases, said nozzle comprising a series of fixed lobes projecting into the gas passage through the nozzle so that the exhaust gas leaving the nozzle comprises peripherally a series of angularly-spaced streams separated by atmospheric air, said nozzle also comprising an adjustable member for varying the nozzle area, which member is movable between the reduced-area position and a maximum-area position, said adjustable member and said fixed lobes being located at substantially equidistantly spaced points of a circle, said adjustable member being located at one of said points, and said lobes being located one at each of the remainder of said points, each of said lobes and said adjustable member in the reduced-area position of the latter being exposed each at substantially the same area to the exhaust gases of the nozzle, and control means connected to cause movement of the adjustable member from the maximum-area position to the reduced area position, said control means being connected to the pilot's throttle lever to be actuated to effect such last mentioned movement following passage through said range of movement and thus only when the throttle lever is adjusted to its maximum thrust setting, whereby for all settings of the throttle lever through the said range of movement the adjustable member is in its maximum-area position.

2. An engine as claimed in claim 1, said control means comprising a ram connected to move the adjustable member, a pressure fluid supply supplying the ram to operate it, a switch which is actuated when the throttle lever reaches and leaves its maximum thrust setting, and means connected to be actuated by said switch and controlling the supply of pressure fluid to the ram.

3. An engine according to claim 2, said control means including a solenoid, said switch controlling energization and de-energization of the solenoid, a valve member actuated by said solenoid, and a piston valve controlling the supply of pressure fluid to the ram, said piston valve being connected to be moved by pressure fluid supply under control of said valve member.

4. An engine according to claim 3, wherein the piston valve has a pair of spaced lands of different effective areas, the space between the lands being open to the pressure fluid supply, the side of the smaller area land remote from said space being connected to a low pressure region and the side of the larger area land remote from said space being connected selectively to the pressure fluid supply and to the low pressure region by actuation of the valve member under control of the solenoid.

References Cited in the file of this patent

UNITED STATES PATENTS

| | | |
|---|---|---|
| 2,619,794 | Lombard | Dec. 2, 1952 |
| 2,861,592 | Collins | Nov. 25, 1958 |
| 2,958,186 | Mock | Nov. 1, 1960 |

(Corresponding to British Pat. 750,472)

FOREIGN PATENTS

| | | |
|---|---|---|
| 750,472 | Great Britain | June 13, 1956 |
| 768,553 | Great Britain | Feb. 20, 1957 |
| 781,661 | Great Britain | Aug. 21, 1957 |